US007693982B2

(12) United States Patent
Goldszmidt et al.

(10) Patent No.: US 7,693,982 B2
(45) Date of Patent: Apr. 6, 2010

(54) AUTOMATED DIAGNOSIS AND FORECASTING OF SERVICE LEVEL OBJECTIVE STATES

(75) Inventors: Moises Goldszmidt, Moss Beach, CA (US); Ira Cohen, Sunnyvale, CA (US); Terence Patrick Kelly, Palo Alto, CA (US); Julie Anna Symons, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1543 days.

(21) Appl. No.: 10/987,611

(22) Filed: Nov. 12, 2004

(65) Prior Publication Data

US 2006/0188011 A1     Aug. 24, 2006

(51) Int. Cl.
G06F 15/173   (2006.01)
G06F 7/60     (2006.01)
G06F 17/10    (2006.01)
G06F 15/18    (2006.01)
G06F 11/00    (2006.01)
G06E 1/00     (2006.01)
G06E 3/00     (2006.01)
G06G 7/00     (2006.01)

(52) U.S. Cl. ................ 709/224; 709/223; 703/2; 703/13; 706/20; 706/21; 714/39; 714/47

(58) Field of Classification Search .......... 714/39, 714/47; 709/223, 224; 703/2.13; 706/20, 706/21
See application file for complete search history.

(56) References Cited

U.S. PATENT DOCUMENTS 5,799,154 A * 8/1998 Kuriyan ................. 709/223

| 6,377,907 | B1 * | 4/2002 | Waclawski ............. 702/182 |
| 6,556,659 | B1 * | 4/2003 | Bowman-Amuah ....... 379/9.04 |
| 6,560,569 | B1 * | 5/2003 | Abu El Ata ............... 703/2 |
| 6,643,613 | B2 * | 11/2003 | McGee et al. ........... 702/186 |
| 6,738,933 | B2 * | 5/2004 | Fraenkel et al. .......... 714/47 |
| 6,917,839 | B2 * | 7/2005 | Bickford ................. 700/30 |
| 6,928,398 | B1 * | 8/2005 | Fang et al. ............... 703/2 |
| 7,039,559 | B2 * | 5/2006 | Froehlich et al. ......... 702/187 |
| 7,110,913 | B2 * | 9/2006 | Monroe et al. ........... 702/179 |
| 7,124,054 | B2 * | 10/2006 | Kim et al. ............... 702/181 |
| 7,237,023 | B2 * | 6/2007 | Menard et al. ........... 709/224 |
| 7,260,551 | B2 * | 8/2007 | Phillips .................. 705/10 |

(Continued)

OTHER PUBLICATIONS

Cockcroft, A. , et al., "Sun performance and tuning : Java and the Internet /", Englewood Cliffs, N.J. : *Prentice Hall PTR*, Book,(1998 [2nd ed.]).

(Continued)

*Primary Examiner*—Kevin Bates
*Assistant Examiner*—Wing Ma (57) ABSTRACT

Systems, methods, and software used in performing automated diagnosis and identification of or forecasting service level object states. Some embodiments include building classifier models based on collected metric data to detect and forecast service level objective (SLO) violations. Some such systems, methods, and software further include automated detecting and forecasting of SLO violations along with providing alarms, messages, or commands to administrators or system components. Some such messages include diagnostic information with regard to a cause of a SLO violation. Some embodiments further include storing data representative of system performance and detected and forecast system SLO states. This data can then be used to generate reports of system performance including representations of system SLO states.

16 Claims, 7 Drawing Sheets

U.S. PATENT DOCUMENTS

| | | | |
|---|---|---|---|
| 7,275,017 B2 * | 9/2007 | Dini et al. | 702/182 |
| 7,277,826 B2 * | 10/2007 | Castelli et al. | 702/186 |
| 7,280,988 B2 * | 10/2007 | Helsper et al. | 706/26 |
| 7,328,265 B2 * | 2/2008 | Anstey et al. | 709/226 |
| 7,350,186 B2 * | 3/2008 | Coleman et al. | 717/103 |
| 2002/0019869 A1 * | 2/2002 | Goldszmidt et al. | 709/224 |
| 2002/0144178 A1 * | 10/2002 | Castelli et al. | 714/15 |
| 2002/0183971 A1 * | 12/2002 | Wegerich et al. | 702/185 |
| 2003/0036886 A1 | 2/2003 | Stone | |
| 2003/0036890 A1 * | 2/2003 | Billet et al. | 703/2 |
| 2003/0046130 A1 * | 3/2003 | Golightly et al. | 705/7 |
| 2003/0046297 A1 * | 3/2003 | Mason | 707/102 |
| 2003/0093527 A1 | 5/2003 | Rolia | |
| 2003/0093528 A1 | 5/2003 | Rolia | |
| 2003/0120771 A1 | 6/2003 | Laye et al. | |
| 2003/0208523 A1 | 11/2003 | Gopalan et al. | |
| 2003/0233391 A1 | 12/2003 | Crawford, Jr. et al. | |
| 2004/0064557 A1 | 4/2004 | Karnik | |
| 2004/0088400 A1 * | 5/2004 | Daggett | 709/224 |
| 2004/0153563 A1 * | 8/2004 | Shay et al. | 709/232 |

OTHER PUBLICATIONS

Jain, Raj, "The Art of Computer Systems Performance Analysis", *John Wiley & Sons*, 1991.

Aguilera, Marcos K., et al., "Performance Debugging for Distributed Systems of Black Boxes", M. K. Aguilera, J. C. Mogul, J. L. Wiener, P. Reynolds, and A. Muthitacharoen. Performance debugging for distributed systems of black boxes. In *Proceedings of the ACM Symposium on Operating Systems Principles (SOSP)*, Bolton Landing, NY, Oct. 2003.

Barham, Paul, et al., "Magpie: real-time modelling and performance-aware systems", P. Barham, R. Isaacs, R. Mortier, and D. Narayanan. Magpie: Online modelling and performance-aware systems. In *Proceedings of the Ninth Workshop on Hot Topics in Operating Systems (HotOS IX)*, May 2003.

Chen, Mike Y., et al., "Path-based failure and evolution management", M.Y. Chen, A. Accardi, E. Kiciman, D. Patterson, A. Fox, and E. Brewer. Path-based failure and evolution management. In *Proceedings of the First Symposium on Networked System Design and Implementation (NSDI?04)* Mar. 2004.

Friedman, NIR, et al., "Bayesian Network Classifiers", *Kluwer Academic Publishers*, Boston. Manufactured in the Netherlands., This paper is an extended version of Geiger (1992) and Friedman and Goldszmidt (1996a)., 1-37.

Garg, Pankaj K., et al., "Web Transaction Analysis and Optimization (TAO)", P. K. Garg, M. Hao, C. Santos, H.-K. Tang, and A. Zhang. Web transaction analysis and optimization. *Technical Report HPL-2002-4*, Hewlett-Packard Labs, Mar. 2002.

\* cited by examiner

AUTOMATED DIAGNOSIS AND FORECASTING OF SERVICE LEVEL OBJECTIVE STATES

BACKGROUND INFORMATION

Enterprise computing systems and networked enterprise computing systems continue to grow in scale and in the complexity of their components and interactions. Today's large-scale networked enterprise computing systems and services exhibit complex behaviors stemming from the interaction of workload, software structure, hardware, network traffic conditions, and system goals, such as service level objectives and agreements. Because of this considerable growth in both scale and complexity, performance issues are difficult to identify, forecast, and diagnose.

There are many commercial frameworks on the market for coordinated monitoring of the large-scale systems and services that can aggregate information from a variety of sources and present it to operators. However, the complexity of the data these systems and services collect and aggregate surpasses the ability of humans to decipher to allow timely and accurate diagnosis and response.

DETAILED DESCRIPTION

In the following detailed description, reference is made to the accompanying drawings that form a part hereof, and in which is shown by way of illustration specific embodiments in which the subject matter may be practiced. These embodiments are described in sufficient detail to enable those skilled in the art to practice them, and it is to be understood that other embodiments may be utilized and that structural, logical, and electrical changes may be made without departing from the scope of the subject matter. Such embodiments of the subject matter may be referred to, individually and/or collectively, herein by the term "invention" merely for convenience and without intending to voluntarily limit the scope of this application to any single invention or inventive concept if more than one is in fact disclosed.

The functions or algorithms described herein are implemented in hardware, software or a combination of software and hardware in one embodiment. The software comprises computer executable instructions stored on computer readable media such as memory or other types of storage devices. Further, such functions correspond to modules, which are software, hardware, firmware, or any combination thereof. Multiple functions are performed in one or more modules as desired, and the embodiments described are merely examples. The software is executed on a digital signal processor, application specific integrated circuit (ASIC), microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the process flow is applicable to software, firmware, and hardware implementations.

Figure 1:
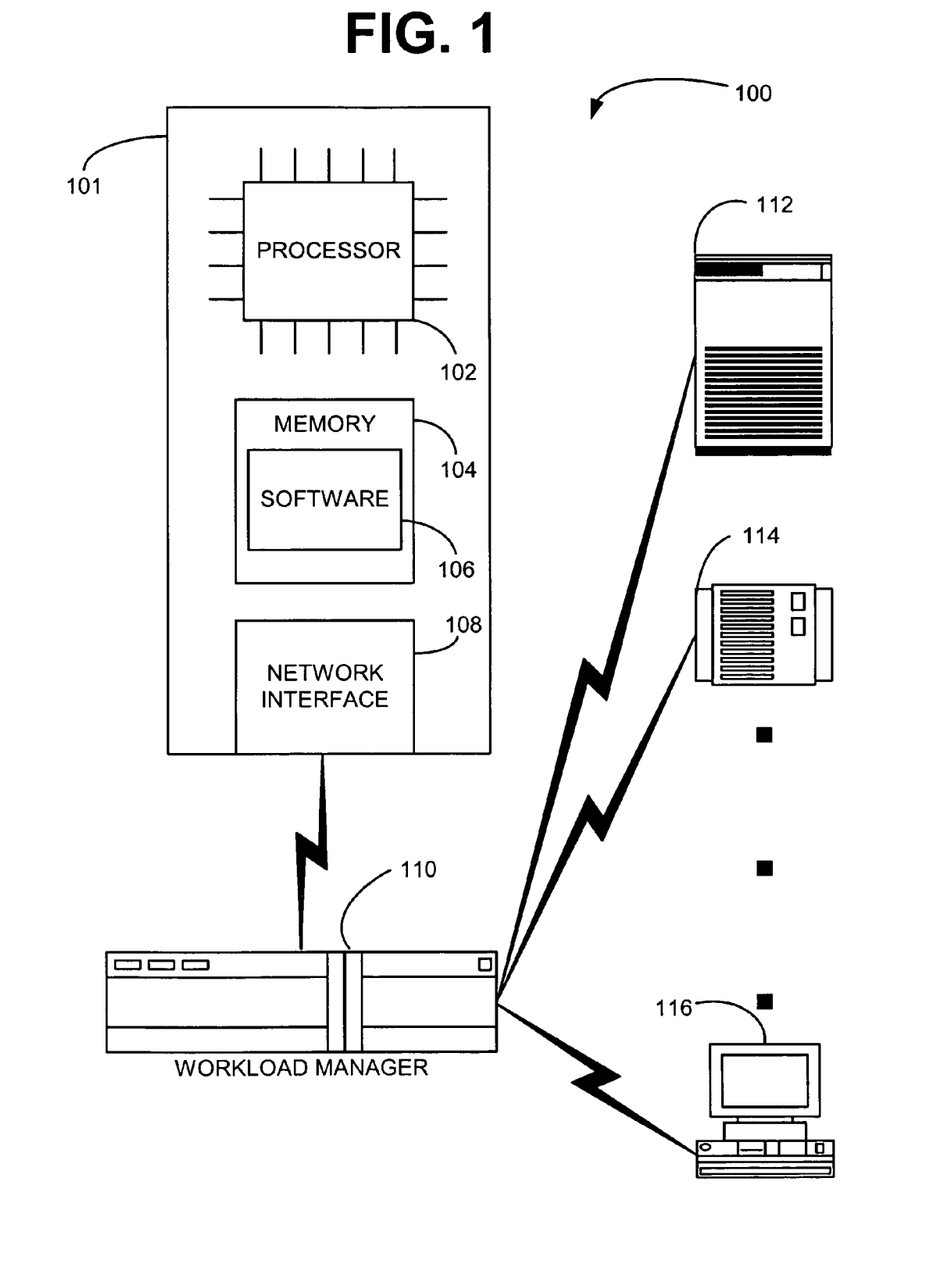
FIG. 1 is a schematic block diagram of a system according to an example embodiment.

FIG. 1 is a schematic block diagram of a networked system 100 according to an example embodiment. The networked system 100 includes various components such as a computing device 101, a workload manager 110, and computing resources 112, 114, and 116. The components of the networked system are interconnected over a network. The network can include any networking technology, such as Ethernet. The network connections can be wired, wireless, of a combination of wired or wireless. In some embodiments, the network of the networked system 100 is a system area network that is coupled to a larger local area network or wide area network, such as the Internet.

The computing device 101 can be virtually any type of computing device such as a personal computer, a server class computer, or other application specific computing device. The computing device 101 can be controlled by virtually any operating system such as an operating system from the MICROSOFT® WINDOWS® family, a UNIX derivative operating system, an enterprise server operating system such as International Business Machine's OS/390, or an application specific operating system.

The computing device 101 includes a processor 102, a memory 104, and a network interface 108. The memory 104 holds software 106 that is operable on the processor 102 to perform various operations, tasks, and processes.

The processor 102 of the computing device 101 represents a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), or hybrid architecture, although any appropriate processor may be used. The processor 102 executes instructions. The processor 102 also includes a control unit that organizes data and program storage in memory, such as memory 104, and transfers data and other information in and out of the computing device 101 and, in some embodiments, to and from one or more network connections over the network interface 108.

The memory 104 represents one or more mechanisms for storing data. For example, the memory 104, in various embodiments, includes one or more of a read only memory (ROM), random access memory (RAM), magnetic disk storage media, optical storage media, flash memory devices, and/or other volatile and non-volatile machine-readable media. In other embodiments, the memory includes any appropriate type of storage device or memory 104. Although only one memory 104 is shown, multiple memories 104 of various types and multiple types of storage devices can be present.

The software 106 stored in the memory 104 is operable on the processor 102 to cause the computing device 101 to determine and/or forecast one or more states of the networked system 100 or components therein. In some embodiments, the software 106 is also operable to identify a component or tier of the networked system 100 that is most likely responsible for a negative state of the networked system 100. Some embodiments are further operable to provide an alarm related to a determined or forecasted networked system 100 state. Such alarms can be communicated to a system administrator or to a workload manager 110, or other load balancing device or application within the networked system 100. When the workload manager 110 receives an alarm, the workload manager 110 can perform remedial action to correct or prevent the actual or forecasted negative system state.

The workload manager 110 is a device, or software operating on a device, that operates to distribute network workload, such as network traffic, amongst a group of computing resources capable of handling the network traffic. Some workload managers 110 are also referred to as load balancers. Some workload managers 110 distribute not only the workload, but also distribute resources available on the network, such as content, to increase the capacity of the networked system 100 in processing network traffic related to the distributed resources. The workload manager 110, in some embodiments, is further capable of receiving an alarm from the software 106 related to an actual or forecasted negative networked system 100 state and performing action to correct, prevent, and/or minimize the impact of the negative state. In some embodiments, the workload manager 110 is a software program that is executable on the computing device 101.

The computing resources 112, 114, and 116 represent various resources operable within a networked system 100. These computing resources 112, 114, and 116 are intended to represent any resource within a computing environment with performance that is capable of being measured. Some such resources include hardware resources such as processors, storage mediums (i.e., magnetic disk storage, volatile and non-volatile memories, etc.), routers, network interfaces, and other hardware resources. Some other resources include software components such as application servers, databases, operating systems, networking software, and other software resources.

Figure 2:
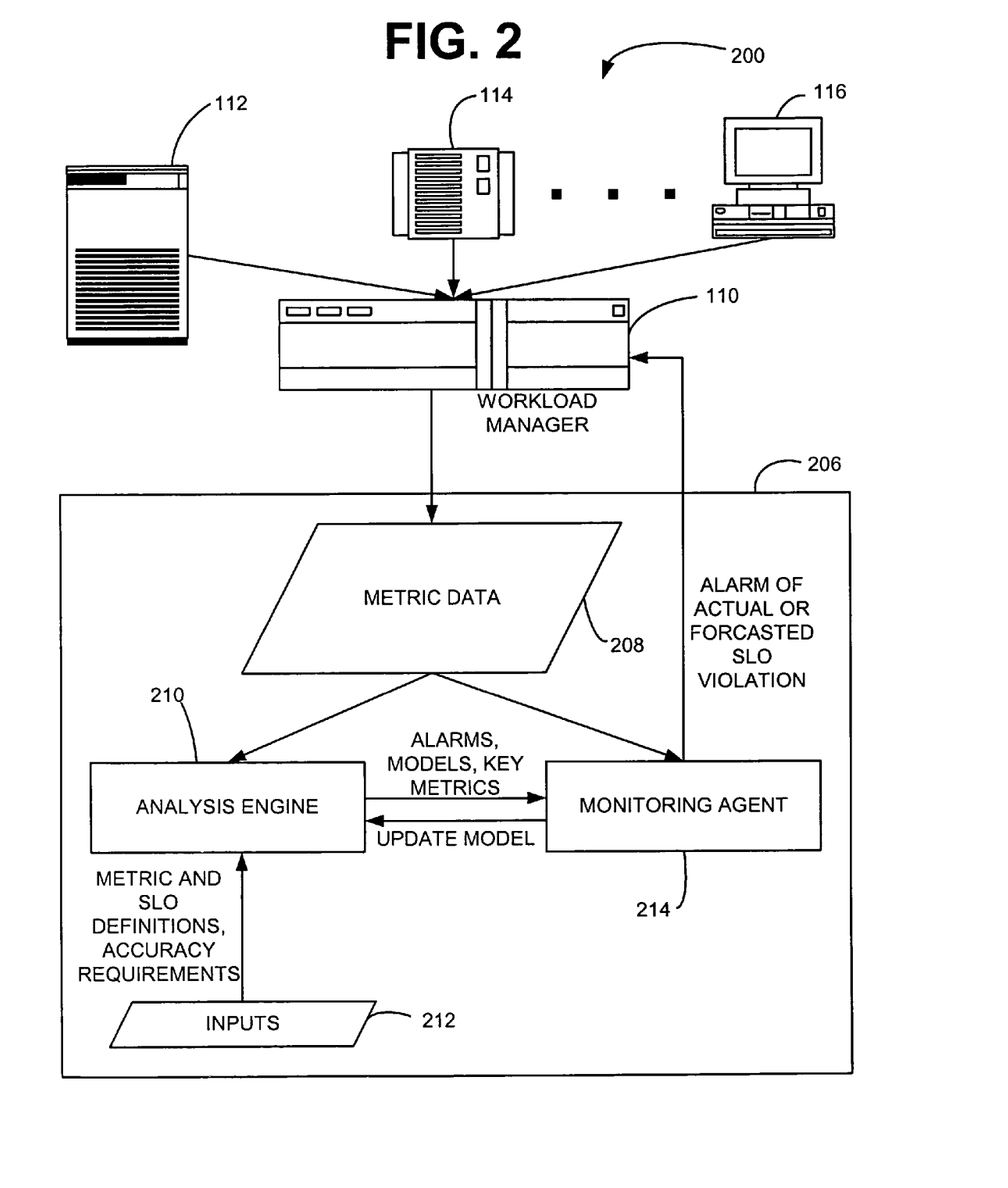
FIG. 2 is a flow diagram of a system according to an example embodiment.

FIG. 2 is a flow diagram of a system 200 according to an example embodiment. The system 200 includes computing resources 112, 114, and 116 operatively coupled to a workload manager 110. The workload manager 110 is further coupled to a computing device 206 that manages compliance with one or more Service Level Objectives or Agreements (SLO/SLA). The computing device 206 includes software to receive metric data 208, perform analysis on the metric data 208, taking into account inputs 212, using an analysis engine 210 to automatically derive a probabilistic classifier model including a SLO state representation for each of a number of possible system 200 states, monitor system 200 performance using a monitoring agent 214, and automatically updating the model to ensure the model accurately reflects changes in the system 200 environment and system 200 performance.

A Service Level Objective (SLO) can be any objective for system performance. SLO's may be performance-oriented objectives. Example SLO's include average response time of transactions, percentile of transactions below a response time, and throughput specifications. An SLO violation occurs when the system 200 fails to meet an SLO. SLO compliance occurs when the system 200 meets the SLO. A Service Level Agreement (SLA) can include one or more SLO's. Specifics of SLO's and SLA's are commonly defined in a contract to provide service. Electronic models of SLO's and SLA's, include a representation of each possible system 200 state indicative. Models are defined in accordance with SLO definitions provided to the analysis engine 210 as inputs 212. Compliance with an SLO is determined by the monitoring agent 214 by comparing metric data 208 to an SLO model and determining which system 200 state representation the metric data 208 most closely fits.

Metrics, from which the metric data 208 is derived, are any measurements that can be obtained from, for example, an operating system, middleware, or applications running on a computer system, such as computing resources 112, 114, and 116. An example of a metric measurement source is MICROSOFT® NT 4.0 Performance Counters. Another example of a metric measurement source is OpenView available from Hewlett-Packard Company. Example metrics include CPU utilization, I/O rates to disk, memory utilization, bandwidth utilization, resource requests, network latency, etc. The result of applying a metric is a measured value indicative of resource performance or a resource state.

The metrics are measured on each of the computing resources 112, 114, and 116 and the values resulting from the metrics are placed into a vector, one vector for each resource 112, 114, and 116. These vectors include data indicative of the metric measurements made at, or within a window, of a period of time. These vectors further include data, such as a boolean value, specifying whether the source computing resource complies with a particular SLO, or a computing resource state in relation to an SLO definition. In some embodiments, there is a vector for each SLO. In some other embodiments that include multiple SLO's, the metric vector includes a boolean value for each SLO.

Once the metric vectors are created, the computing resources 112, 114, and 116 can perform several different actions. The computing resources 112, 114, and 116 can cache the metric vectors or transmit the metric vectors to the workload manager 110. In instances where the metric vectors are cached, the metric vectors can be transmitted to the workload manager 110 upon a request for the metric vectors from the workload manager 110, upon the occurrence of an event, or at a certain interval. In some other embodiments, the metric vectors are transmitted directly to the computing device 206 and received as metric data 208.

The computing device 206 receives the metric data 208 either from the workload manager 110 or directly from the computing resources 112, 114, and 116. The computing device 206 then provides the metric data 208 to the analysis engine 210 and the monitoring agent 214. However, in some embodiments, when the computing device 206 is first initialized, the monitoring agent 214 performs no actions until the analysis engine builds a model. In other embodiments, when a model has been previously built and stored in the computing device 206, such as in a memory 104 as shown in FIG. 1, the monitoring agent 214 retrieves the model and determines which SLO state representation most closely represents a current system state.

The analysis engine 210, upon receipt of the metric data 208 and inputs 212, processes the metric data and the inputs to synchronize the data and characterize relations between the metric data and SLO definition. The analysis engine 210 further generates a model including a representation for each of the possible system 200 states in relation to each SLO and identifies key metrics within each model that are, alone or in combination, indicative of the SLO state the model represents. In some additional embodiments, the analysis engine 210 sets alarms that indicate current SLO violation, forecasted SLO violation, or other various system 200 states. In various embodiments, these alarms include audible alarms, visible alarms, sending of electronic messages, automated telephone calls, paging, or various other alarm or messaging techniques capable of notifying one or more interested parties of a particular system 200 state.

Once a model is generated, the analysis engine 210 provides the model to the monitoring agent 214 along with optional alarms for communicating a certain system state to other system components, such as the workload manager 110, or to certain personnel. Further detail as to the operation of the analysis engine 210 is provided below with reference to FIG. 3 and FIG. 4.

The monitoring agent 214 receives metric data 208 and compares the metric data to the model received from the analysis engine 210. The monitoring agent 214 determines which SLO state representation within the model the metric data most closely fits. If the representation to which the metric data most closely fits includes an alarm, such as a representation of a system 200 state of an SLO violation, that alarm is triggered.

The monitoring agent 214 further causes the model built by the analysis engine 210 to be updated. The monitoring agent 214 causes the model to be updated under a number of situations. One such situation includes the passage of a period, such as 24 hours. Other situations causing the models to be updated include a number of detected or forecasted SLO violations indicating the model is no longer indicative of system performance, detection of a certain system 200 state, addition or removal of a resource from the system 200, or various other situations. Further detail as to the operation of the monitoring agent 214 is provided below with reference to FIG. 6 and FIG. 7.

Figure 3:
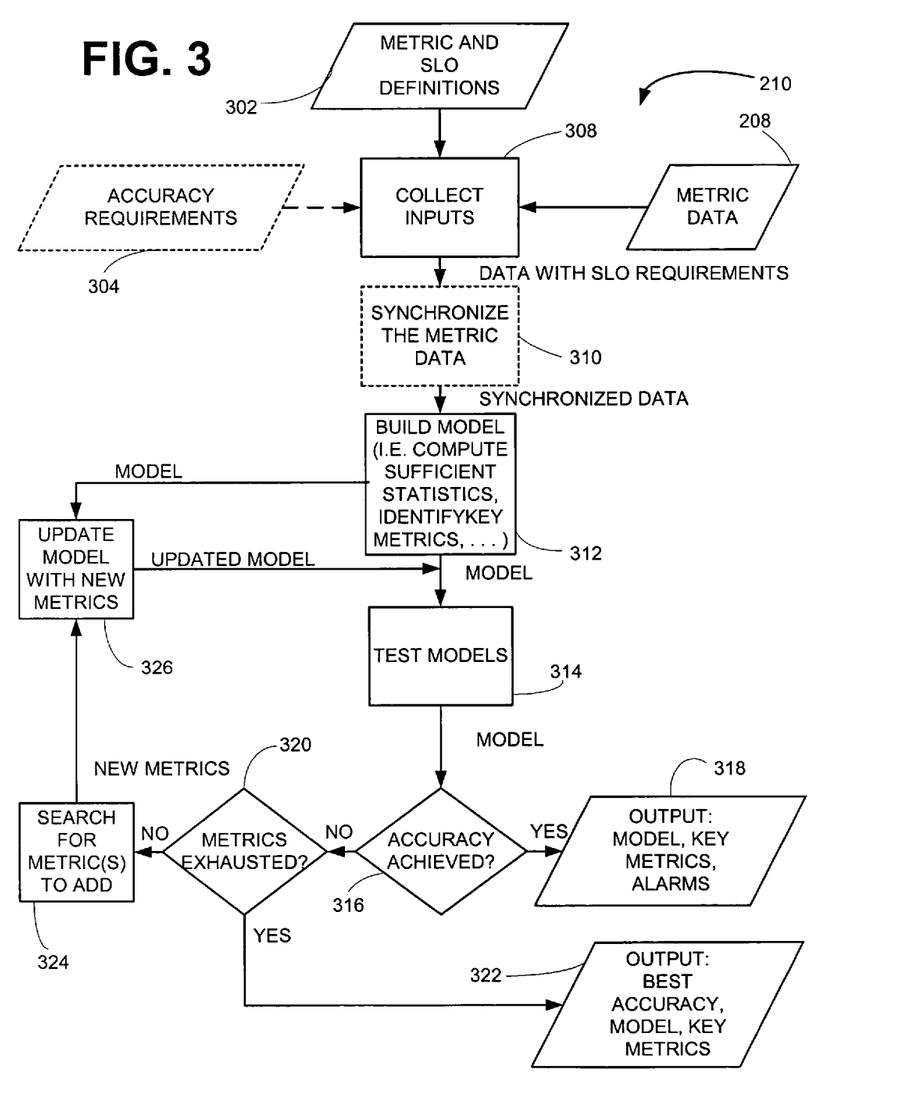
FIG. 3 is a data flow diagram according to an example embodiment.

FIG. 3 is a data flow diagram according to an example embodiment of an analysis engine 210. The analysis engine 210 performs various functions. Some of these functions include collecting inputs 308, synchronizing data 310, building a model 312 of SLO states, testing the model 314, and updating the model 326. The analysis engine 210 performs these functions at various times during operation of a system, such as system 200 of FIG. 2. These functions of the analysis engine 210 can be performed upon initialization of a system 200 to build the first model the system 200 will use to monitor system 200 performance. These functions can also be performed during operation of the system 200 to ensure the model continues to reflect the system 200 environment and performance behavior.

The analysis engine 210 first collects inputs 308. The inputs that the analysis engine 210 collects include metric and SLO definitions 302 and metric data 208. In some embodiments, the analysis engine 210 further collects optional accuracy specifications 304 for the model built by the analysis engine 210. In yet further embodiments, the analysis engine 210 collects a set of metrics included in the model, to seed the model, the analysis engine builds. Seeding a model can be useful in various situations where a certain metric is commonly indicative of a cause of a SLO violation. Including seeded metrics in a model can provide diagnostic capabilities for the system 200.

The optional accuracy specifications 304 for a model built by the analysis engine 210 are minimum accuracy thresholds that a model built by the analysis engine 210 may achieve. The optional accuracy specifications can also be for forecast prediction accuracies. These forecast prediction accuracies are minimum accuracy thresholds at which each generated model predicts a system state at a given time interval. For example, the time interval is three minutes and the accuracy is 90%. Each model will be generated to forecast an SLO state three minutes prior to a violation, the forecast being accurate at least 90% of the time.

Once the inputs are collected 308, some embodiments include synchronizing the metric data 310. To synchronize the metric data 310 the analysis engine 210 collects the metric vectors from the metric data 208 measured over a period of time and synchronizes 310 the collected data. The metric data 208 may be synchronized 310 when the data from the various computing resources 112, 114, and 116 is not measured at equal intervals. For example, if the metric data 208 from a first resource is measured every minute and the metric data from a second resource is measured every three minutes, the data is not synchronized. Thus, the analysis engine 210 synchronizes the metric data 310 by determining the greatest interval at which the metric data is measured amongst the resources. The analysis engine 210 then converts the data measured at smaller intervals to synchronize with the data measured at the greatest interval. This conversion is performed by averaging the metric data measured at the smaller intervals over a period equal to the greatest interval. For example, the metric data of the first resource measured at one-minute intervals will be summed over a period equal to the greatest interval (i.e., three minutes) and divided by the number of summed intervals (three). This average of intervals is calculated for metrics that are not synchronized with the metrics having the greatest interval.

The analysis engine 210 next builds the model 312, the model including a representation of each SLO state within an SLO definition. The number of SLO states is normally two, one for SLO compliance and another for SLO violation. Further detail with regard to how a model is built is provided below with reference to FIG. 4.

In some embodiments, after the model is built 312, the model is tested 314. Testing the model 314 includes comparing the model to metric vectors and classifying each metric vector by SLO state according to which SLO state representation each metric vector most closely fits. Each metric vector classification is then compared with the boolean value specifying the SLO state of its respective metric vector. The accuracy of a model is the number of correctly classified metric vectors with a boolean value correlated to the model divided by the total number of metric vectors classified as most closely fitting that model. If the accuracy for a certain model is greater than or equal to the optional accuracy specification 304 threshold, the model is output 318 along with the key metrics of that model and any optional alarms.

If the optional accuracy specification 304 threshold is not achieved for a model, the analysis engine 210 determines if the metrics are exhausted 320 within that model for building a more accurate model. If the metrics are exhausted 320, the model is output 322 along with an indicator of the most accuracy achieved and indicators of the key metrics within that model.

If the metrics are not exhausted, the analysis engine 210 searches for metrics to add 324 to the model. The model is then updated with new metrics 326 and the analysis engine 210 tests the model 314. This process is repeated until either the optional accuracy specifications 304 are achieved or the metrics are exhausted 320.

Figure 4:
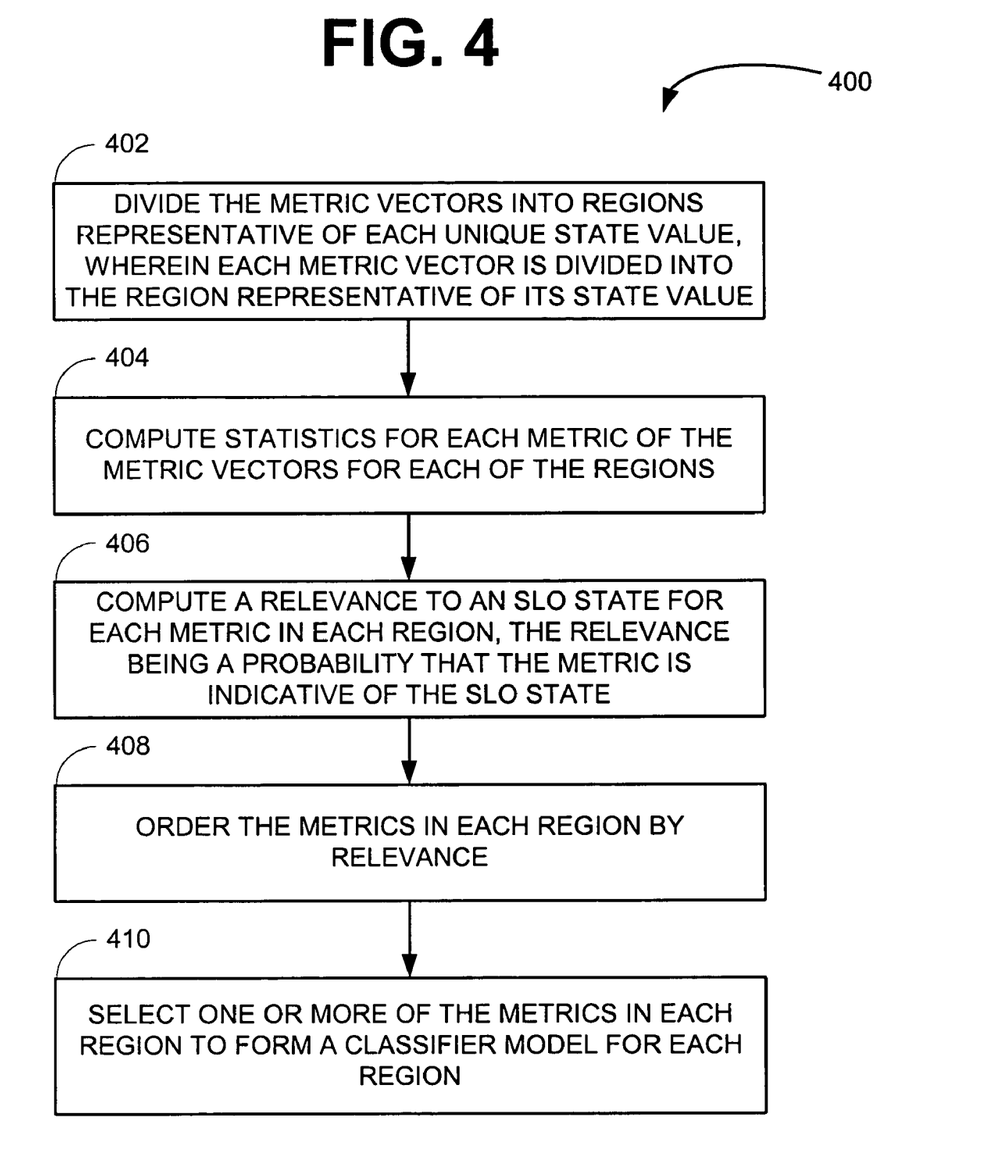
FIG. 4 is a block diagram of a method according to an example embodiment.

FIG. 4 is a block diagram of a method 400 according to an example embodiment. This example embodiment provides further detail to a method of building models 312 and testing models 314, as shown in FIG. 3. This method 400 includes dividing the metric vectors into regions representative of each unique state value, wherein each dataset is divided into the region representative of its state value 402, computing sufficient statistics for each metric of the metric vectors for each of the two regions 404, and computing a relevance to an SLO state for each metric in each region, the relevance being a probability that the metric is indicative of the SLO state 406. This method 400 further includes ordering the metrics in each region by relevance 408 and selecting one or more of the metrics in each region to form a classifier model for each region 410.

Dividing the metric vectors into regions representative of each unique state value 402 can be performed in a number of ways. Two such ways include dividing the metric vectors based on SLO state data at the time the values in the metric vectors were measured or based on SLO state data at a time in the future from when the values in the metric vectors were measured. For example, where a model being built is to be used in determining a current system SLO state, the metric vectors are divided 402 into regions based on the data in the metric vectors specifying an SLO state at the time the data in the vector was measured. In other instances where the models are built for forecasting future system SLO states, the metric vectors are divided into regions based on the metric data in a first vector. The first vector is then augmented with an SLO state indicator from a second vector originating with the same computing resource, the vector data measured t period after the metric data in the first vector was measured. The resulting vector includes data for forecasting a system state t period after the data in the first vector was measured.

The method 400 then computes sufficient statistics for each metric of the metric vectors for each SLO state region 404. After the sufficient statistics are computed 404 for each metric in each SLO state region, a multidimensional model has been created for each SLO state region for use in determining a system SLO state based on metric data. The number of dimensions is equal to the number of metrics in the metric vectors. The multidimensional model can be used to determine a probability of a system SLO state by comparing a metric vector against the model for each SLO state. The current state will be the SLO state representation within the model to which the metric vector most closely fits. The closest fit is determined by the highest probability from the comparing.

However, in some instances, comparing every value in a metric vector against each of multiple SLO state representations with a model may not be desirable. It may not be desirable in instances where one or more of the metrics within a model are not indicative of a system SLO state or when a metric is only sometimes indicative of a system SLO state. Thus, removing irrelevant metrics, as well as those metrics that are not predictive of an SLO state, and leaving only key metrics for use in determining a system SLO state, can increase the accuracy of a model and provide better insight to a cause of a system SLO state.

Key metrics are metrics within a model that are most indicative of the SLO state of the model. The key metrics are identified by computing a relevance score for each metric in the model and then ordering the metrics according to relevance in decreasing order. In one embodiment, the relevance score is a probability that a single metric is indicative of the SLO state of a system. In other embodiments, the relevance score is a probability that a group of metrics are indicative of the SLO state of a system. In some instances, the relevance score of a single metric or of a group of metrics is also a probability that the metric or group of metrics indicate a root cause of a negative SLO state of a system.

In some embodiments, a relevance score is determined for each metric from a perspective of mathematical equations. In one equation view, let $\vec{M}$ denote a vector of metrics M. Let S be a variable representing a state value. In this instance, S can have two states from the set $\{1,0\}$ or the set $\{s^+, s^-\}$. These states in each set represent, respectively, compliance or violation of a SLO. To find the relevance score to allow for selection of key metrics in a model, the subset $\vec{M}^*$ of $\vec{M}$ is found, the subset $\vec{M}^*$ constituting the key indicators of S. This approach is based on the assumption that this is equivalent to the issue of feature selection in a pattern classification context. The pattern classification issue includes finding the function F that maps $\vec{M}$ to S.

In one embodiment, an accuracy score may be used to evaluate the quality of the mapping F:

$$P_A(S=F(\vec{M})). \tag{1}$$

This score expresses the probability that the output of the function F equals the state of the SLO given the vector $\vec{M}$ as input.

In another embodiment, a balanced accuracy (BA) may be used to evaluate the quality of the mapping F:

$$BA = \frac{P(s^- = F(\vec{M})|s^-) + P(s^+ = F(\vec{M})|s^+)}{2} \tag{2}$$

This score is an average of the probability of correctly identifying SLO compliance with the probability of detecting a SLO violation.

Finding the feature selection includes:

$$\vec{M}* = \mathrm{argmax}_{\vec{M'}} P(S = F(\vec{M'})) \tag{3}$$

where $\vec{M'}$ is a subset of $\vec{M}$. That is, finding the subset of the metrics that maximizes the accuracy of the classification function. This subset can be considered to be composed of key indicators as they, through the function F, determine the state S of the SLO.

Thus, in determining the key metrics, F is found, an accuracy score is computed, and optimization of Equation 3 is be performed.

A dataset D of n samples of the behavior of a system is essentially a matrix composed of pairs $<\vec{M}, S>$. Then function F may be induced from a subsample of D. There are many ways to do this. One approach is based on finding Bayesian classifiers. One advantage of using these probabilistic based classifiers is that they induce a model of the space composed by the metrics $\vec{M}$ and the SLO state S in the form of a probability distribution. This makes the function F invertible, so that, for example, the ranges of values of the metrics $\vec{M}$ for each of the different states of the SLO may be characterized. This capability can be used in issue isolation and attribution (diagnosis).

The induction of a Bayesian classifier, or other probabilistic pattern classifier, is a two-step process. The first setup in this process consists of inducing or fitting a distribution $P(S|\vec{M'})$ to a subsample of D, called the training set. The training set is used in building a model including a representation of each SLO state, such as building model 312 as illustrated in FIG. 3 and in method 400 of FIG. 4. The rest of the samples in D are used to test the accuracy (compute $P_A$ or BA), such as in testing a model 314 and determining if a proper accuracy is achieved 316 as shown in FIG. 3. This subset of D is called the test set. The second step consists of imposing a decision function on $P(S|\vec{M'})$:

$$F = 1 \text{ iff } P(S=1 | \vec{m}') \geq t. \tag{4}$$

If the actual probability that captures the relationship between S and $\vec{M}$, then the threshold t that optimizes the accuracy is 0.5, and $1-P_A$ is called the Bayes error. In a precise sense this is the maximum accuracy that can be obtained given the information in the vector of metrics $\vec{M}$.

The problem of computing F is reduced to that of first fitting a probability distribution and then finding a suitable threshold t. For fitting a probability distribution we use one of the many probabilistic based network classifiers, such as a Naïve Bayesian Classifier or Tree-Augmented Bayesian Network (TAN), as described in the "*Bayesian Network Classifiers*" (N. Friedman, D. Geiger, and M. Goldszmidt; *Machine Learning*, 29(2):131-163, 1997).

To compute the accuracy score, the rest of the sample in D, the test set, is used to compute an approximation of $P_A$ or BA depending on the embodiment. The frequency is computed with which the decision rule in Equation 4 actually coincides with the actual state of S in the data.

Finally, for the optimization of Equation 3, a search process is used. The initial approach, keeping in mind the constraints of a product, is to use a greedy heuristic procedure.

At this point, there is a probabilistic model for each SLO state relating each state of an SLO to different values and patterns of metrics that are collected.

In some instances, further information can be extracted from a model to use in diagnosing sources of negative system SLO states. In step one above, the behavior of each metric is baselined when an SLO is violated and when there is compliance. This information can be used to compute statistics regarding which of the key metrics are in a violation state more often when an SLO is violated. This provides a correlation between SLO states and metrics that measure certain system components or system operational behaviors. These correlations can be used in providing diagnostic information for inclusion with alarms or through a system interface to system administrators. In some embodiments, these correlations can be used to send commands or messages to system components, whether hardware or software components, to perform action to remedy an actual or forecasted SLO violation. In some embodiments, such messages or commands include a message to a workload manager, such as workload manager 110 illustrated in FIG. 1 and FIG. 2, to distribute network traffic to one or more other resources.

In one embodiment, the interpretability and modifiability of models is enhanced utilizing a TAN (or Bayesian networks in general). In this embodiment, the influence of each metric on a violation of an SLO can be quantified in a sound probabilistic model. Mathematically, the following functional form may be shown for the classifier of Equation 5 as a sum of terms, each involving the probability that the value of some metric M, occurs in each state given the value of its predecessor $m_{p_i}$:

$$\sum_i \log \left[ \frac{P(m_i | m_{pi}, s^-)}{P(m_i | m_{Pi}, s^+)} \right] + \log \frac{P(s^-)}{P(s^+)} > 0 \tag{5}$$

Each metric may be subjected to a likelihood test comparing the probability that the observed value occurs during compliance to the probability that the value occurs during violation. A sum value greater than zero indicates a violation. This analysis catalogs each type of SLO violation according to the metrics and values that correlate with observed instances. Furthermore, the strength of each metric's influence on the classifier's choice is given from the probability of its value occurring in the different states.

This structure gives insight into the causes of the violation or even how to repair it. For example, if violation of a temperature threshold is highly correlated with an open window, then one potential solution might be to close the window. Of course, any correlation is merely "circumstantial evidence" rather than proof of causality; much of the value of the analysis is to "exonerate" the metrics that are not correlated with the failure rather than to "convict the guilty."

Thus, because these models are interpretable and have substantially clear semantics in terms of probability distributions, the information induced directly from data with expert knowledge of the domain or system under study may be enhanced and complemented. This knowledge can take the form of explicit lists of metrics to be included in a model (i.e., seeding the model), information about correlations and dependencies among the metrics, or prior probability distributions.

Figure 5:
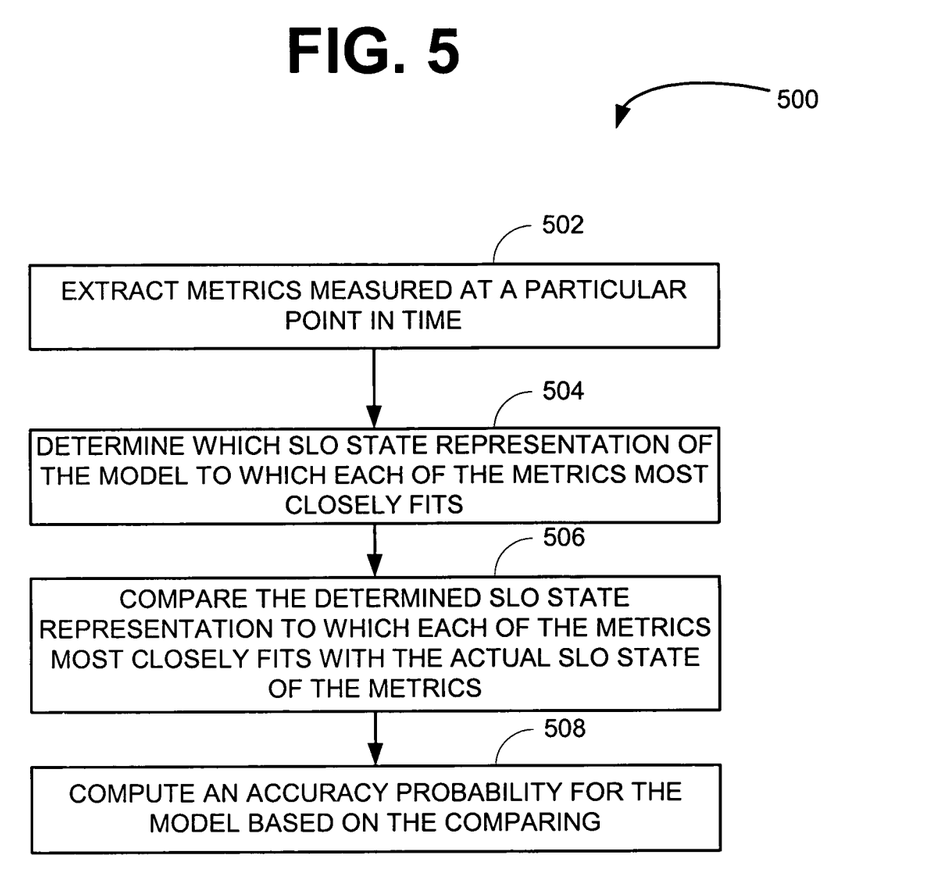
FIG. 5 is a block diagram of a method according to an example embodiment.

FIG. 5 is a block diagram of a method 500 according to an example embodiment. This method 500 illustrates another example embodiment of the analysis engine 210 of FIG. 2 which includes determining model accuracy. This method 500 includes extracting metrics measured at a particular point in time 502 and determining which SLO state representation within a model each of the metrics most closely fits 504. The method 500 further includes comparing the determined SLO state representation with the actual SLO state of the metrics 506 and computing an accuracy probability for the model based on the comparing 508. Some embodiments include outputting the models along with their computed accuracy probabilities. Other embodiments further include comparing the computed accuracy of each classifier model with an accuracy threshold and rebuilding classifier models failing to meet the accuracy threshold. Rebuilding the model includes manipulating the metrics included in models failing to meet the accuracy threshold.

Figure 6:
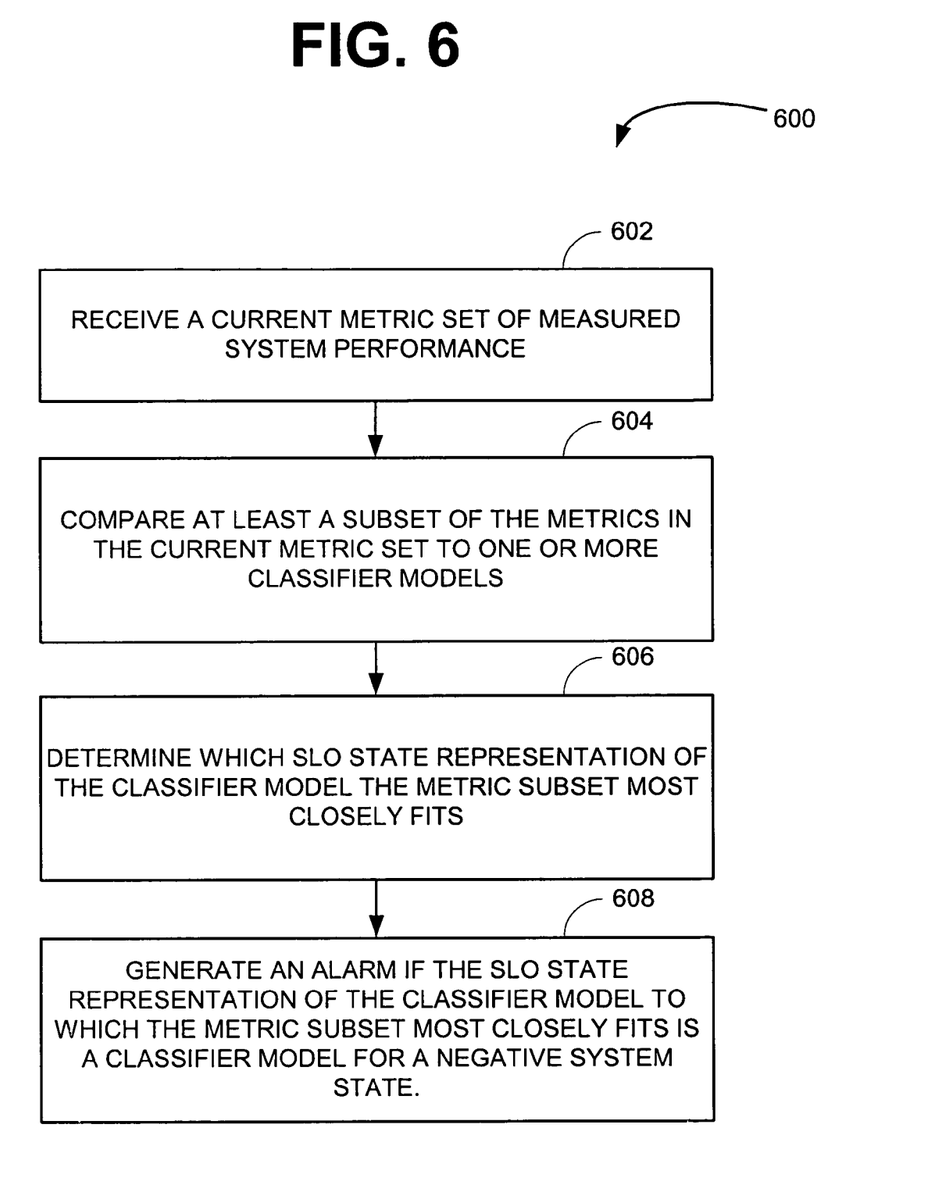
FIG. 6 is a block diagram of a method according to an example embodiment.

FIG. 6 is a block diagram of a method 600 according to an example embodiment. This method 600 provides one example embodiment of how the monitoring agent 214 of FIG. 2 operates. In this example, the monitoring agent 214 receives a current metric set, from the metric data 208, of measured system performance 602 and compares at least a subset of the metrics in the current metric set to a classifier model 604. The current metric set can include one or more metric vectors from one or more computing resources 112, 114, and 116. The classifier model includes a model generated by the analysis engine 210. The method 600 further includes determining which SLO state representation of the classifier model the metric subset most closely fits 606 and generating an alarm if the SLO state representation of the classifier model to which the metric subset most closely fits is a classifier model for a negative system state 608. In some embodiments, the alarms include alarms of forecasted negative SLO states such as a forecasted SLO violation. In other embodiments, the alarms are indicative of a current SLO violation.

Figure 7:
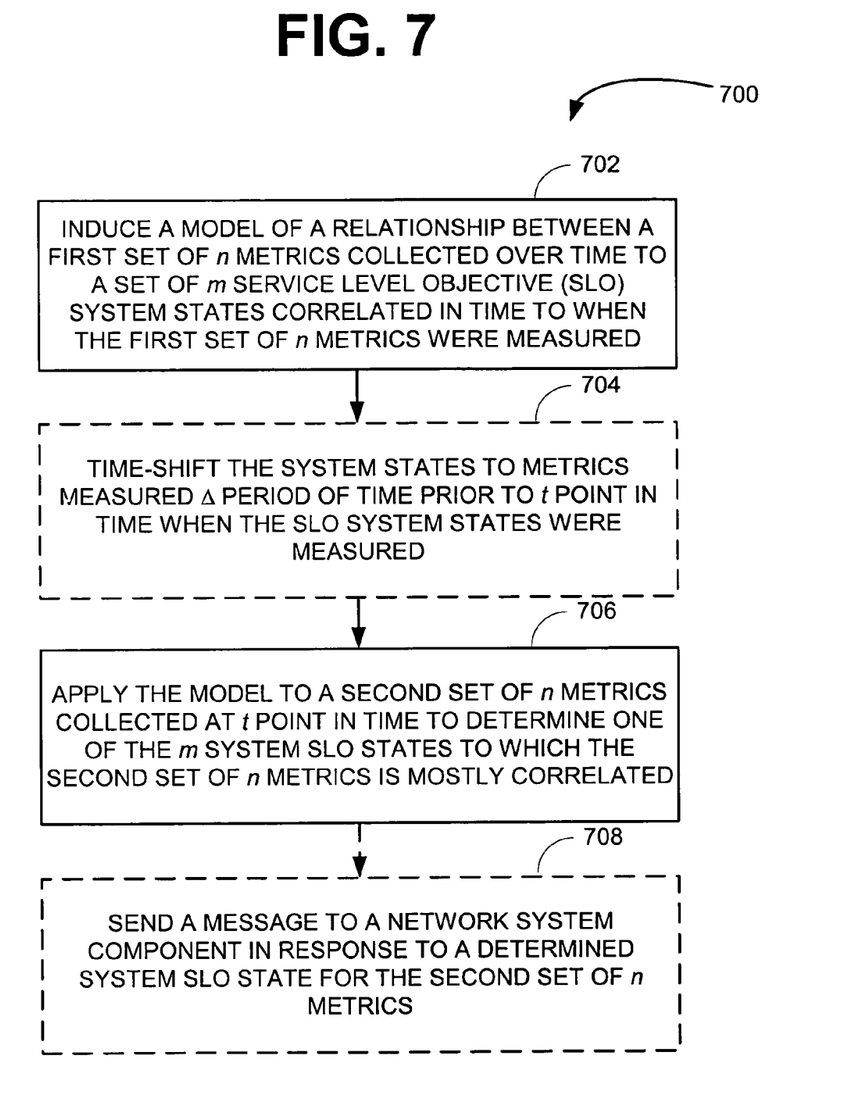
FIG. 7 is a block diagram of a method according to an example embodiment.

FIG. 7 is a block diagram of a method 700 according to an example embodiment. This method 700 includes inducing a model of a relationship between a first set of n metrics collected over time to a set of m system SLO states correlated in time to when the first set of n metrics were measured 702. This method 700 further includes applying the model to a second set of n metrics collected at t point in time to determine one of the m system SLO states to which the second set of n metrics is mostly correlated 706.

In some embodiments, the method 700 further includes time-shifting the system states to the first set of n metrics measured Δ period of time prior to t point in time when the system SLO states were measured 704 and sending a message to a network system component in response to a determined system SLO state for the second set of n metrics 708. The result of applying the model to the second set of n metrics is a forecasted system SLO state for t+Δ point in time.

In some embodiments of the method 700, the induced model 702 is rebuilt upon the occurrence of an event. This event, in various embodiments, includes a determination that the model is not representative of system performance, passage of Δ period, a system fault, a specified number of actual or forecasted SLO violations, an administrator command, or various other similar types of events. In one embodiment, Δ period is five minutes, while in other embodiments, Δ period is 24 hours.

Some embodiments of the method 700 further include performing the method at regular intervals to continuously monitor system performance. Some embodiments of the method 700 also include storing data obtained as a result of inducing a model of a relationship between a first set of n metrics 702 and as a result of applying the model to a second set of n metrics 706. This stored data is then used in generating a report to provide a historical view of system performance. Such reports can also provide a representation of system performance in relation to a SLO. Such reports can be output by the method 700 on a regular or periodic basis to provide interested persons, such as system administrators, a view of system performance.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this subject matter may be made without departing from the principles and scope of the subject matter as expressed in the subjoined claims.

What is claimed is:

1. A method of automated diagnostics and forecasting of service level objective (SLO) states, the method comprising:
    collecting, by a computer, datasets from metrics over time, each dataset including a state value representative of compliance with a service level objective;
    synchronizing, by the computer, the collected datasets;
    building, by the computer, a classifier model based on the datasets and their state values, wherein the model includes a number of SLO state representations equal to a number of unique SLO state values represented in the collected datasets;
    determining, by the computer, relevance scores for the metrics to indicate which of the metrics are more predictive of a corresponding SLO state and which of the metrics are less predictive of the corresponding SLO state; and
    determining, by the computer, a probability of a particular one of the SLO states by comparing selected metrics with the classifier model, wherein the selected metrics are metrics having higher relevance scores.

2. The method of claim 1, wherein building the classifier model based on the datasets and their state values comprises:
    dividing the datasets into regions representative of each unique SLO state value, wherein each dataset is divided into the region representative of its SLO state value;
    identifying and ranking, for each region, key metrics based on the relevance scores, wherein the key metrics are more predictive of respective SLO states.

3. The method of claim 2, wherein identifying the key metrics further includes identifying one or more previously identified key metrics, and values for those metrics, to include in the classifier model.

4. The method of claim 1, wherein building the classifier model based on the datasets and their state values comprises:
    dividing the datasets into regions representative of each unique state value, wherein each dataset is divided into the region representative of its state value;
    computing sufficient statistics for each metric of the datasets for each of the regions;
    computing the relevance score for each metric in each region, the relevance score being a probability that the metric is predictive of the SLO state;
    ordering the metrics in each region by the corresponding relevance scores; and
    selecting one or more of the metrics in each region to form a SLO state representation for each region.

5. The method of claim 1, further comprising:
    testing the classifier model to determine an accuracy of the classifier model using the collected datasets, wherein the accuracy of the model is a probability that the model correctly identifies the SLO states associated with the collected datasets.

6. The method of claim 5, wherein testing the classifier model to determine an accuracy of the classifier model comprises:
    extracting metrics measured at a particular point in time;
    determining which SLO state representation each of the metrics most closely fits;
    comparing the determined SLO state representation with the actual SLO state of the metrics; and
    computing an accuracy probability for the model based on the comparing.

7. The method of claim 6, further comprising:
    comparing the accuracy probability of the classifier model with an accuracy threshold; and
    rebuilding the classifier model if it fails to meet the accuracy threshold, wherein rebuilding the model includes manipulating the metrics included in the model.

8. The method of claim 1, wherein the number of unique state values is two, a first state value representative of SLO compliance and a second state value representative of SLO violation.

9. A computer readable storage medium, with instructions thereon that when executed by a computer cause the computer to:
    collect datasets from metrics over time, each dataset including a state value representative of compliance with a service level objective;

synchronize the collected datasets;

build a classifier model based on the datasets and their state values, wherein the model includes a number of SLO state representations equal to a number of unique SLO state values represented in the collected datasets;

determine relevance scores for the metrics to indicate which of the metrics are more predictive of a corresponding SLO state and which of the metrics are less predictive of the corresponding SLO state; and determine a probability of a particular one of the SLO states by comparing selected metrics with the classifier model, wherein the selected metrics are metrics having higher relevance scores.

10. The computer readable storage medium of claim 9, wherein building the classifier model based on the datasets and their state values comprises:

dividing the datasets into regions representative of each unique SLO state value, wherein each dataset is divided into the region representative of its SLO state value;

identifying and ranking, for each region, key metrics based on the relevance scores, wherein the key metrics are more predictive of respective SLO states.

11. The computer readable storage medium of claim 10, wherein identifying the key metrics further includes identifying one or more previously identified key metrics, and values for those metrics, to include in the classifier model.

12. The computer readable storage medium of claim 9, wherein building the classifier model based on the datasets and their state values comprises:

dividing the datasets into regions representative of each unique state value, wherein each dataset is divided into the region representative of its state value;

computing sufficient statistics for each metric of the datasets for each of the regions;

computing the relevance score for each metric in each region, the relevance score being a probability that the metric is predictive of the SLO state;

ordering the metrics in each region by the corresponding relevance scores; and selecting one or more of the metrics in each region to form a SLO state representation for each region.

13. The computer readable storage medium of claim 9, wherein the instructions further cause the computer to:

test the classifier model to determine an accuracy of the classifier model using the collected datasets, wherein the accuracy of the model is a probability that the model correctly identifies the SLO states associated with the collected datasets.

14. The computer readable storage medium of claim 13, wherein testing the classifier model to determine an accuracy of the classifier model comprises:

extracting metrics measured at a particular point in time;

determining which SLO state representation each of the metrics most closely fits;

comparing the determined SLO state representation with the actual SLO state of the metrics; and computing an accuracy probability for the model based on the comparing.

15. The computer readable storage medium of claim 14, wherein the instructions further cause the computer to:

compare the accuracy probability of the classifier model with an accuracy threshold; and rebuild the classifier model if it fails to meet the accuracy threshold, wherein rebuilding the model includes manipulating the metrics included in the model.

16. The computer readable storage medium of claim 9, wherein the number of unique state values is two, a first state value representative of SLO compliance and a second state value representative of SLO violation.

* * * * *